United States Patent
Gates

(10) Patent No.: US 6,202,117 B1
(45) Date of Patent: *Mar. 13, 2001

(54) HOST ADAPTER INTEGRATED CIRCUIT HAVING AUTOACCESS PAUSE

(75) Inventor: Stillman F. Gates, Los Gatos, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/302,017

(22) Filed: Apr. 29, 1999

Related U.S. Application Data

(63) Continuation of application No. 08/869,665, filed on Jun. 5, 1997, now Pat. No. 5,960,180, which is a continuation of application No. 08/301,461, filed on Sep. 7, 1994, now abandoned.

(51) Int. Cl.[7] .................................................. G06F 13/38
(52) U.S. Cl. ........................... 710/129; 710/114; 710/244
(58) Field of Search ........................... 710/129, 107–125, 710/200–244

(56) References Cited

U.S. PATENT DOCUMENTS 4,131,945 * 12/1978 Richardson et al. ................... 714/55
4,535,404 * 8/1985 Shenk ..................................... 710/59

(List continued on next page.)

*Primary Examiner*—Paul R. Myers
(74) *Attorney, Agent, or Firm*—Skjerven Morrill MacPherson LLP; Ronald J. Meetin

(57) ABSTRACT

A host adapter integrated circuit has a dedicated circuit which detects an attempted access of a digital resource (for example, SCSI bus interface circuitry) from a system bus (for example, a PCI bus) and automatically generates a pause request signal to stop instruction execution of a sequencer of the host adapter integrated circuit. The sequencer stops executing instructions, the sequencer is decoupled from the digital resource, and the digital resource is coupled to the system bus. With the digital resource coupled to the system bus, the system bus access of the digital resource is completed. In some embodiments, a pause acknowledge signal is generated by bus transfer logic of the sequencer to indicate that the digital resource can be accessed from the system bus. This pause acknowledge signal is used to generate a ready signal onto the system bus. The digital resource is therefore accessed from the system bus in one system bus cycle, an attempted access by a device on the system bus is not interrupted by another device on the system bus, and the accessing device need perform no special polling.

18 Claims, 8 Drawing Sheets

U.S. PATENT DOCUMENTS

| | | | |
|---|---|---|---|
| 4,669,043 | * | 5/1987 | Kaplinsky ................................. 711/3 |
| 4,831,523 | | 5/1989 | Lewis ..................................... 399/848 |
| 4,885,683 | | 12/1989 | Coogan ............................ 395/185.12 |
| 5,021,950 | * | 6/1991 | Nishikawa . |
| 5,029,074 | * | 7/1991 | Maskas et al. ........................ 710/129 |
| 5,046,023 | * | 9/1991 | Katsura et al. ....................... 395/134 |
| 5,070,473 | * | 12/1991 | Takano et al. ........................ 710/260 |
| 5,390,304 | | 2/1995 | Leach et al. ........................... 395/375 |
| 5,467,295 | * | 11/1995 | Young et al. ......................... 709/210 |
| 5,488,688 | * | 1/1996 | Gonzales et al. ...................... 714/34 |
| 5,504,670 | | 4/1996 | Barth et al. ........................... 364/134 |
| 5,506,995 | * | 4/1996 | Yoshimoto et al. ................. 710/107 |
| 5,530,906 | * | 6/1996 | Cho et al. .............................. 710/61 |
| 5,535,419 | * | 7/1996 | O'Brien ................................. 710/36 |
| 5,557,757 | * | 9/1996 | Gephardt et al. .................... 710/126 |
| 5,564,023 | | 10/1996 | Young ................................... 345/280 |
| 5,581,745 | * | 12/1996 | Muraoka et al. .................... 713/502 |
| 5,732,241 | * | 3/1998 | Chan ..................................... 711/131 |

OTHER PUBLICATIONS

"iAPX 86/88, 186–188 User's Manual, Hardware Reference", Intel Corp., 1985, pp. 1–110 through 1–118.

"iAPX 286 Hardware Reference Manual", Intel Corp., 1983, pp. 3–61 through 3–64 and A–30 through A–31.

BusMaster Fast SCSI Adapter for PCI Local Bus, data sheet, BusLogic, Inc., Jul. 1994, 2 pp.

"18C30 SCSI IC Technical Reference Manual", Future Domain Corporation, Jul. 28, 1993, pp. 1–1 through 7–1 plus initial/terminal pp.

"36C70 SCSI IC Technical Reference Manual", Future Domain Corporation, Nov. 24, 1993, pp. 1–1 through 7–1 plus initial/terminal pp.

"Product Focus: PC SCSI host adapter boards," *Computer Design*, Mar. 28, 1994, pp. 11–14.

* cited by examiner

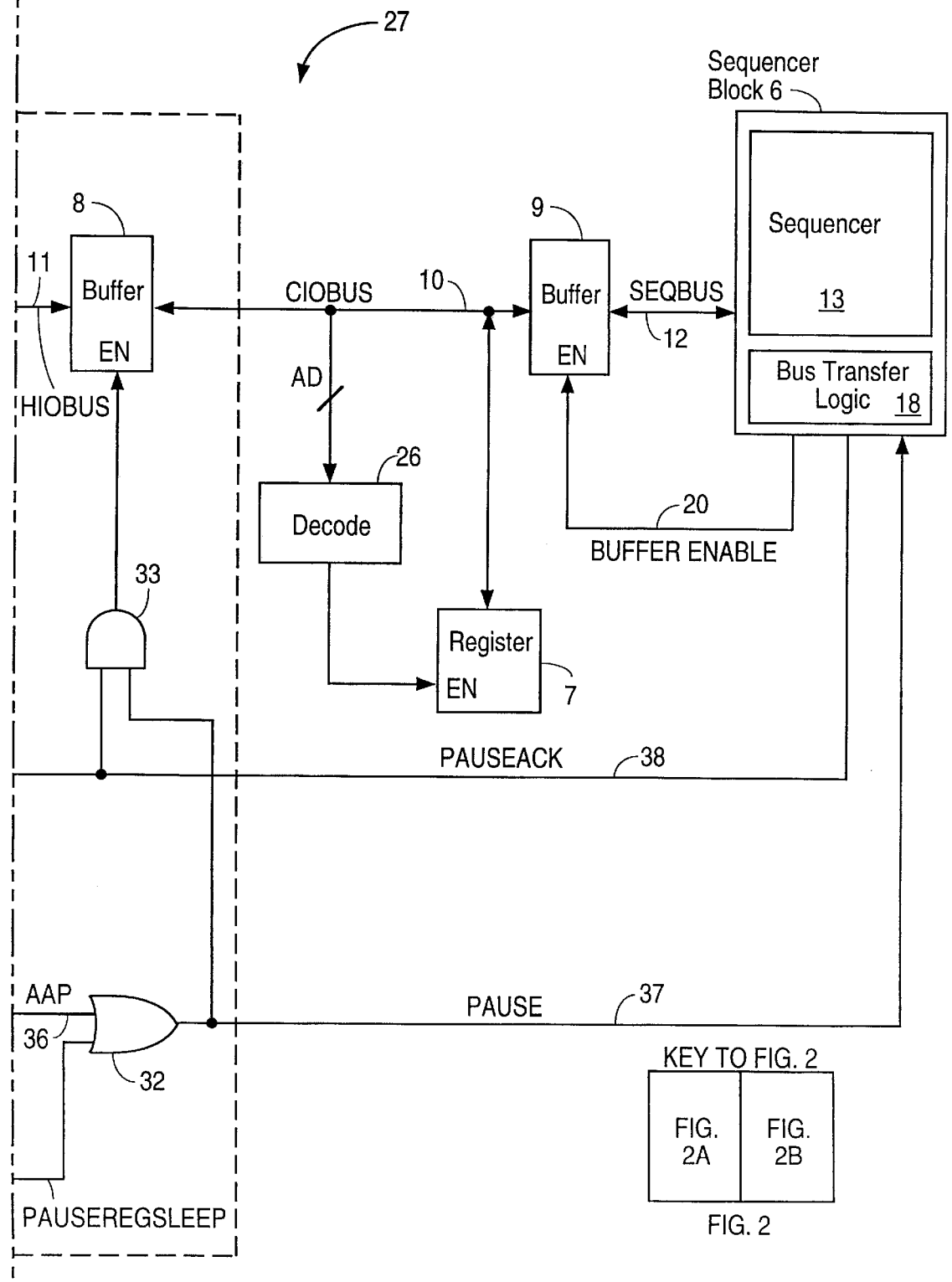

FIG. 3

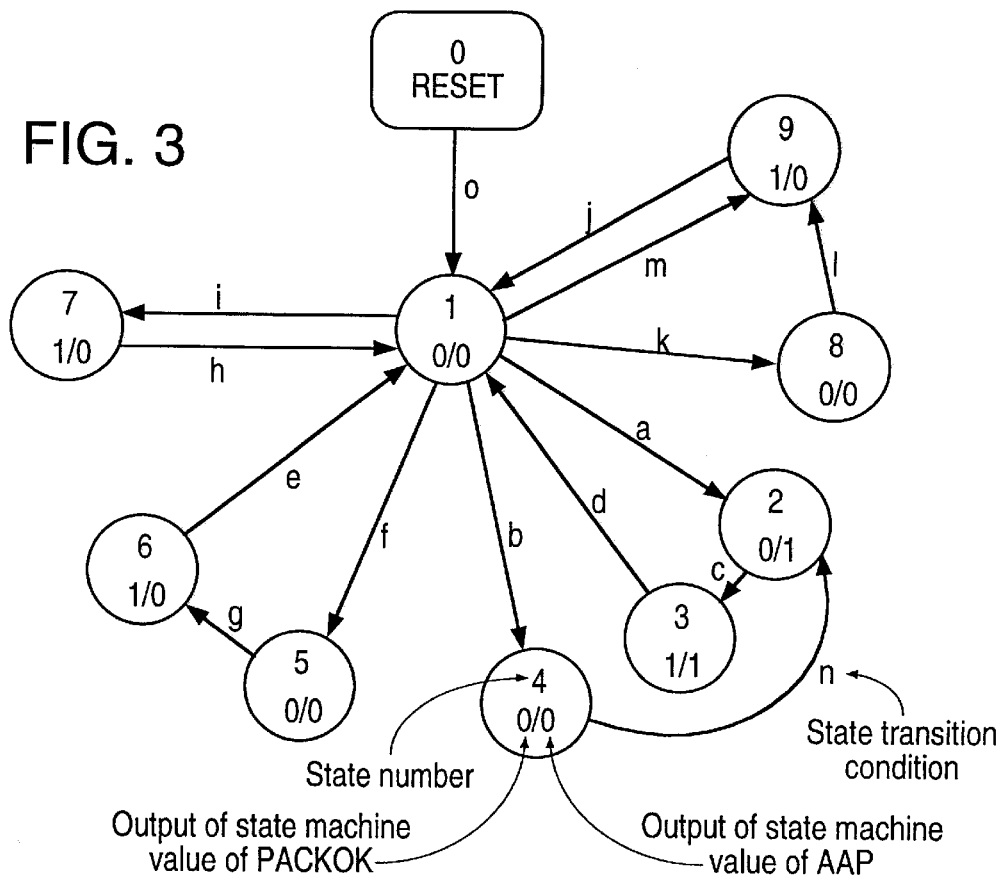

STATE TRANSITION CONDITIONS a = INRANGE • NOERROR • $\overline{PAS}$ • TCYCLE • TDATAPH • PLb = INRANGE • NOERROR • PAS • TCYCLE • TDATAPH • PLc = PL- • PAS d = $\overline{ENDTCYCLEL\text{-}}$ e = $\overline{ENDTCYCLEL\text{-}}$ f = INRANGE • NOERROR • $\overline{PAS}$ • TCYCLE • TDATAPH • PL g = PL • PAS h = $\overline{ENDTCYCLEL\text{-}}$ i = PS • PAS • $\overline{HCNTRLADR}$ • TDATAPH j = $\overline{TDATAPH}$ k = HCNTRLADR • ((PS • $\overline{PAS}$) + ($\overline{PS}$ • PAS)) • TDATAPH l = (PS • PAS) + $\overline{(PS + PAS)}$ m = HCNTRLADR • (($\overline{PS}$ • $\overline{PAS}$) + (PS • PAS))

n = PL- • $\overline{PAS}$ o = THPORS-

FIG. 4

HOST ADAPTER INTEGRATED CIRCUIT HAVING AUTOACCESS PAUSE

CROSS REFERENCE TO RELATED APPLICATIONS

This is a continuation of U.S. patent application Ser. No. 08/869,665, filed Jun. 5, 1997, now U.S. Pat. No. 5,960,180, which is a continuation of U.S. patent application Ser. No. 08/301,461, filed Sep. 7, 1994, now abandoned.

CROSS REFERENCE TO MICROFICHE APPENDICES

The microfiche appendix, which is a part of the present disclosure, is a microfiche appendix of two sheets of microfiche having a total of 71 frames. The microfiche appendix contains detailed schematics of a specific embodiment of a host adapter integrated circuit. A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND INFORMATION

A personal computer typically comprises a motherboard on which a CPU, main memory, and a plurality of expansion slots are disposed. The CPU and main memory may be referred to as the "host". In order to couple the host to a device (for example, a hard disk), a printed circuit board called a "host adapter card" is typically plugged into one of the expansion slots. The host adapter card is typically coupled to the hard disk via a ribbon cable and a bus (such as a Small Computer System Interface (SCSI) bus) and is coupled to the host via the expansion slot and a system bus (such as the Peripheral Component Interconnect (PCI) bus)). The host therefore can read data from and write data to the hard disk through the host adapter card. Many functions of the host adapter card (such as a PCI bus interface for interfacing to the host and a SCSI bus interface for interfacing with a hard disk) may be integrated into a single integrated circuit called a "host adapter integrated circuit" which is disposed on the host adapter card.

SUMMARY

A host adapter integrated circuit has circuitry which detects an attempted access of a digital resource (for example, a register of a SCSI bus interface) from an external system bus (for example, a PCI bus) and automatically generates a pause request signal to a sequencer on the host adapter integrated circuit. The pause request signal causes the sequencer to stop executing instructions. The sequencer is decoupled from the digital resource and the digital resource is coupled to the system bus. With the digital resource coupled to the system bus, the system bus cycle access of the digital resource is completed. In some embodiments, a pause acknowledge signal is generated by bus transfer logic of the sequencer indicating that the digital resource is ready to be accessed from the system bus. This pause acknowledge signal is used to generate a ready signal onto the system bus. The ready signal is an indication to the device on the system bus attempting the access that the attempted system bus cycle can be completed.

BRIEF DESCRIPTION OF THE DRAWINGS

FIG. 3 is a state diagram for an autoaccess pause controller circuit.

FIG. 4 is a listing of state transition conditions for the state diagram of FIG. 3.

DETAILED DESCRIPTION OF THE PREFERRED EMBODIMENTS

Figure 1:
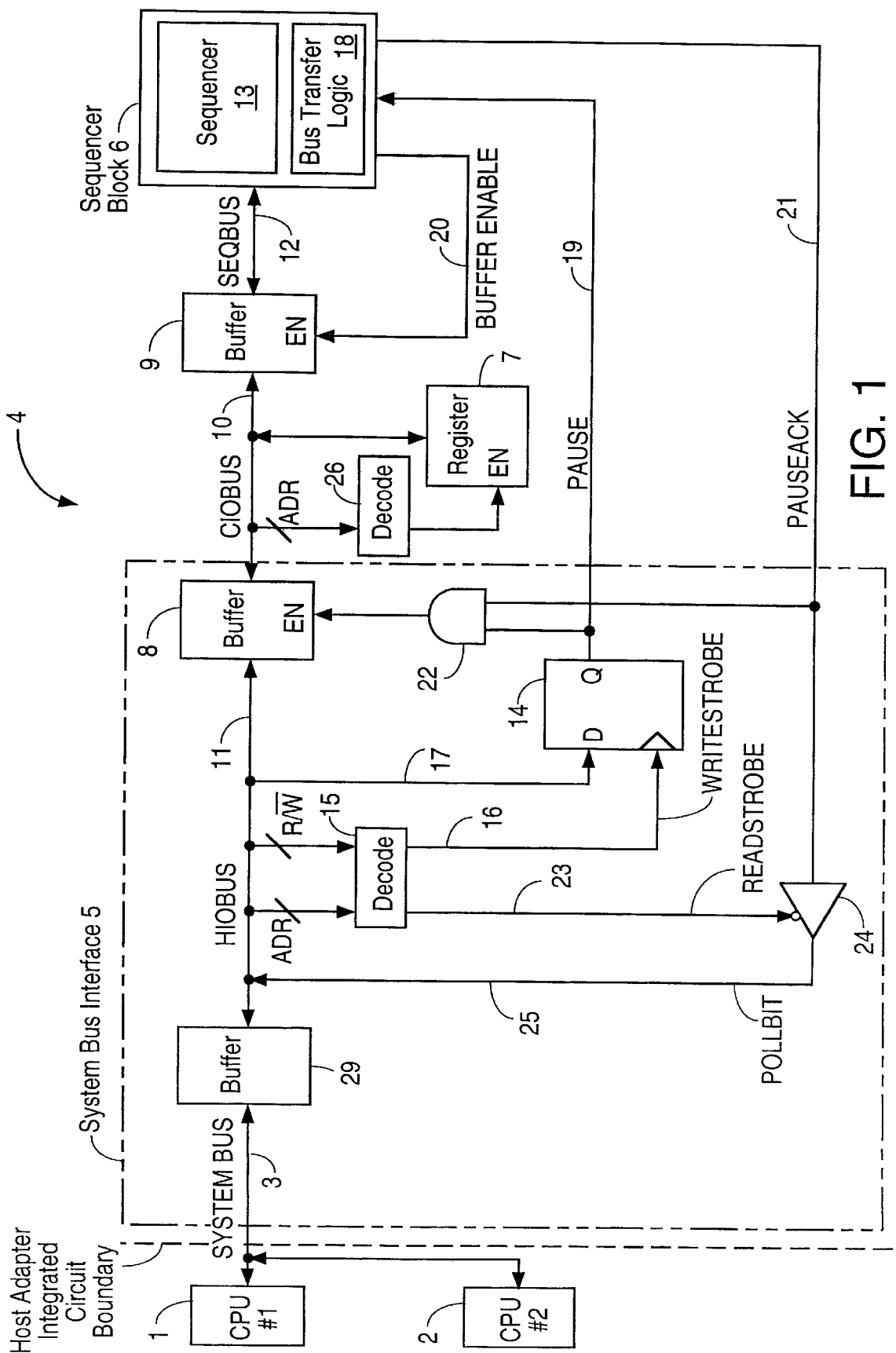
FIG. 1 is a simplified block diagram of one embodiment of a host adapter integrated circuit.

FIG. 1 is a simplified diagram showing a first CPU (central processing unit) 1 and a second CPU 2 of a personal computer coupled via a system bus 3 to a host adapter integrated circuit 4. The host adapter integrated circuit is disposed on a host adapter interface card which is insertable into a card slot of the motherboard of the personal computer. The first and second CPUs are disposed on the motherboard. The host adapter integrated interface card performs the function of transferring information between the CPUs and a disk drive (not shown).

The host adapter integrated circuit chip therefore has a system bus interface 5 for interfacing to the first and second CPUs and also has a SCSI bus interface (not shown) for interfacing to the disk drive. A sequencer block 6 on the host adapter integrated circuit chip 4 manages the transfer of data between the system bus and the SCSI bus. An example of a host adapter integrated circuit as well as a host adapter interface card on which the host adapter integrated circuit is disposed is set forth in copending U.S. patent application Ser. No. 07/964,532, filed Oct. 15, 1992, entitled the subject matter of which is incorporated herein by reference.

It may be desirable to have a digital resource (for example, register 7) which is accessible by both the sequencer and the CPUs. Two bus buffers 8 and 9 are therefore provided to prevent contention on a CIOBUS 10 to which the resource is directly coupled. The CIOBUS 10 is therefore isolated from an HIOBUS 11 by bus buffer 8 and the CIOBUS 10 is isolated from a SEQBUS 12 by bus buffer 9. When a sequencer 13 inside sequencer block 6 is reading from register 7, bus buffer 9 is enabled and bus buffer 8 is disabled, thereby coupling CIOBUS 10 to SEQBUS 12 and allowing register 7 to drive data through bus buffer 9, onto SEQBUS 12, and to sequencer 13.

Consider the situation in which sequencer 13 is reading from register 7 and it is desired that CPU 1 intervene and read from register 7. CPU 1 first performs an I/O write instruction to write a digital logic one into a pause flip-flop 14. A decoder 15 receives the address bits and a read/write bit from HIOBUS 11 to generate a write strobe signal onto conductor 16 to clock pause flip-flop 14. The digital one is written into flip-flop 14 by providing a digital one on the D input of the flip-flop 14 during the transition of the strobe signal. The digital one is supplied to the D input by a conductor 17 which couples a data conductor of the HIOBUS 11 to the D input. When the flip-flop is clocked, a PAUSE request signal is asserted to a digital one and is supplied to bus transfer logic 18 inside sequencer block 6 via conductor 19. After the CPU 1 has written to the pause flip-flop 14, the CPU 1 is free to go on to execute other tasks if desired. When the bus transfer logic 18 receives the PAUSE request signal from the pause flip-flop 14, the sequencer 13 completes execution of its current instruction.

The bus transfer logic 18 then disables bus buffer 9 via a conductor 20. After a suitable amount of time, the bus transfer logic 18 asserts a pause acknowledge signal PAUSEACK onto conductor 21. Because signal PAUSE request is high and signal PAUSEACK is high, an AND gate 22 outputs a high signal thereby enabling bus buffer 8. With bus buffer 9 disabled and bus buffer 8 enabled, the host adapter integrated circuit chip 4 is configured so that register 7 can be read from the system bus 3 by CPU 1.

Prior to accessing register 7, CPU 1 repeatedly polls a poll bit POLLBIT to determine when it is a digital one. CPU 1 reads the POLLBIT by performing an I/O read cycle of a specific address on the system bus. When decoder 15 detects a read to this address, decoder asserts a READSTROBE signal onto a conductor 23, thereby enabling a buffer 24. If the pause acknowledge signal PAUSEACK is not asserted, then CPU 1 will read POLLBIT via conductor 25 to be a digital zero indicating that access to register 7 is not yet permitted. CPU 1 will therefore continue on with other tasks and will repoll the POLLBIT at a later time.

If, on the other hand, the pause acknowledge signal PAUSEACK is asserted, then the POLLBIT signal on conductor 25 will be read by the CPU 1 to be a digital one indicating that access to register 7 (CIOBUS) has been provided. CPU 1 then performs another read cycle on the system bus to drive the appropriate address onto the CIOBUS 10 to read register 7. With bus buffer 8 enabled, decoder 26 detects the address of register 7 and enables register 7 to drive its data onto CIOBUS 10 for reading by CPU 1 back through enabled buffer 8, HIOBUS 11 and SYSTEM BUS 3.

After CPU 1 has read the data from register 7, CPU 1 performs another I/O write to clear pause flip-flop 14 hereby deasserting the PAUSE request signal on conductor 19 and disabling bus buffer 8. This provides a period of time between bus buffer 8 being disabled and bus buffer 9 being enabled to prevent contention on the CIOBUS. When the bus transfer logic 18 of sequencer block 6 detects the PAUSE request signal deasserted, the sequencer block 6 reassumes control of the CIOBUS (and register 7 coupled to the CIOBUS) by disabling bus buffer 8 via signal PAUSEACK and by enabling bus buffer 9 via signal BUFFER ENABLE.

There are, however, problems associated with this structure. First, CPU 1 must perform numerous I/O read and write operations in order to assert the PAUSE request signal, to poll the pause acknowledge signal and to deassert the PAUSE request signal. These numerous operations slow execution of the CPU software. Second, it is possible that a second CPU such as CPU 2 will seize control of the system bus in the time period between the assertion of the PAUSE request-signal and the assertion of the pause acknowledge signal by the sequencer block. This may cause complications because CPU 1 will be prevented from obtaining information it needs to continue performing tasks. Third, under certain conditions it may be desirable for a CPU to be able to access the resource on the CIOBUS 10 without knowledge of the PAUSE request signal and polling mechanism. It may, for example, be desirable for a CPU to be able to access the resource (to perform diagnostics, for example) before loading of the system driver software which has the code for handling the polling.

Figure 2A:
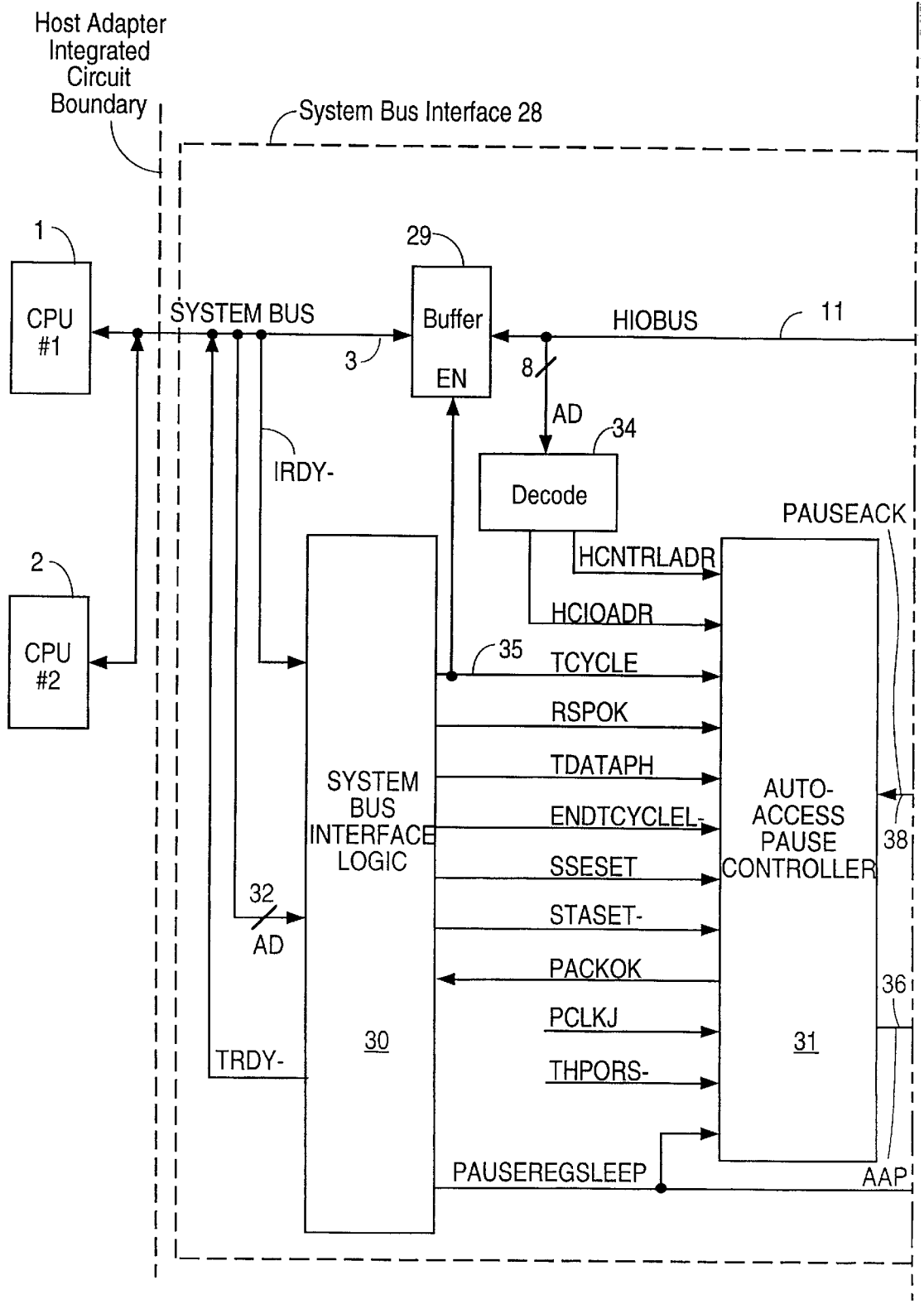
FIG. 2 is a simplified block diagram of another embodiment of a host adapter integrated circuit.

FIG. 2 is a block diagram showing a CPU 1 coupled via a system bus 3 to a host adapter integrated circuit 27 in accordance with an embodiment of the present invention. In some embodiments, the host adapter integrated circuit is disposed on a host adapter card insertable into a card slot of a motherboard of a computer. In other embodiments, the host adapter integrated circuit is disposed on the motherboard. The system bus may be a PCI bus, an ISA bus, an EISA, a VL bus, an S bus, or another suitable system bus. In the specific embodiment illustrated in FIG. 2, system bus 3 is a PCI bus and the system bus interface 28 for the PCI bus includes buffer 8, a buffer 29, system bus interface logic 30, an autoaccess pause controller circuit 31, an OR gate 32, and AND gate 33, and a decoder 34.

The function of the system bus interface logic 30 is largely determined by the system bus protocol. The system bus interface logic 30 includes a plurality of address registers, the contents of which define an address range on the system bus which is reserved for the host adapter integrated circuit 27. These address registers are typically loaded from the PCI bus 3 in an initialization sequence during which the addresses of various devices coupled to the PCI bus are defined. After the initialization sequence, an address comparator of the system bus interface logic 30 compares the address of a bus cycle on the PCI bus 3 with the contents of the address registers and determines whether the address of the system bus cycle is an address allotted to the host adapter integrated circuit 27. If the address is an address allotted to the host adapter integrated circuit 27, then the system bus interface logic 30 asserts the signal TCYCLE onto conductor 35 thereby enabling bus buffer 29 and allowing signals on the system bus 3 to pass through buffer 29 to HIOBUS 11. This operation of the system bus interface logic 30 is determined by operation of the system bus and occurs independently of the operation of the sequencer block 6.

For explanation purposes, consider a situation in which sequencer 13 is reading data from a digital resource (for example, register 7) via CIOBUS 10, bus buffer 9 and SEQBUS 12. Digital resources which may be connected to CIOBUS 10 include, but are not limited to, a SCSI bus interface control block, a data FIFO, scratch RAM, host address registers, host counter registers, and a Fibre Channel interface block. Bus buffer 9 is enabled whereas bus buffers 8 and 29 are disabled. If CPU 1 attempts to read register 7 when sequencer 13 is reading register 7, CPU 1 places the address of register 7 onto the system bus 3 in a system bus cycle. When the system bus interface logic 30 detects the system bus cycle having the address of register 7, the system bus interface logic asserts the signal TCYCLE. Bus buffer 29 is therefore enabled and the signals on system bus 3 are allowed to drive the HIOBUS 11 as described above.

Bus buffer 8 remains disabled, however, so that signals from the system bus 3 which are driving HIOBUS 11 do not contend with signals from register 7 which are driving CIOBUS 10. There is no direction control on buffers 8 and 9. For example, one part of buffer 8 drives data from conductors of the HIOBUS 11 to corresponding conductors of the CIOBUS 10 whereas another part of buffer 8 drives data in the other direction from other conductors of the CIOBUS 10 to corresponding conductors of the HIOBUS 11.

A decoder 34 decodes the address present on the HIOBUS 11. If the address is an address of a resource on the CIOBUS 10 (i.e., a resource for which the autoaccess pause function is required), then the decoder 34 asserts the signal HCIO-ARS. If, on the other hand, the address on the system bus has been decoded to be in ROM space, then system bus interface logic 30 asserts the signal RSPOK. A ROM (not shown) external to the host adapter integrated circuit is coupled to a memory port (not shown) of the host adapter integrated circuit. This ROM, which contains operating system subroutines, is accessed by the host via the CIOBUS 10. The autoaccess pause controller circuit 31 receives the signals HCIOADR and RSPOK and generates internal to circuit 31 (see FIG. 6 described below), the signal INRANGE which is the logical OR (see OR gate 104 in FIG. 6) of the two signals.

Another aspect in accordance with the present invention is the provision of digital resources located on the HIOBUS 11. During an attempted access of these digital resources from the system bus, the value of INRANGE is not true. Accordingly, the autoaccess pause controller 31 does not pause sequencer 13, sequencer 13 continues to execute instructions, and sequencer 13 continues to access digital resources on CIOBUS 10. Accordingly, a CPU can access the other digital resources on HIOBUS 11 via the system bus 3 at the same time that the sequencer accesses digital resources located on the CIOBUS. Buffer 8 isolates the HIOBUS 11 from the CIOBUS 10 when both buses are being simultaneously accessed.

Figure 5:
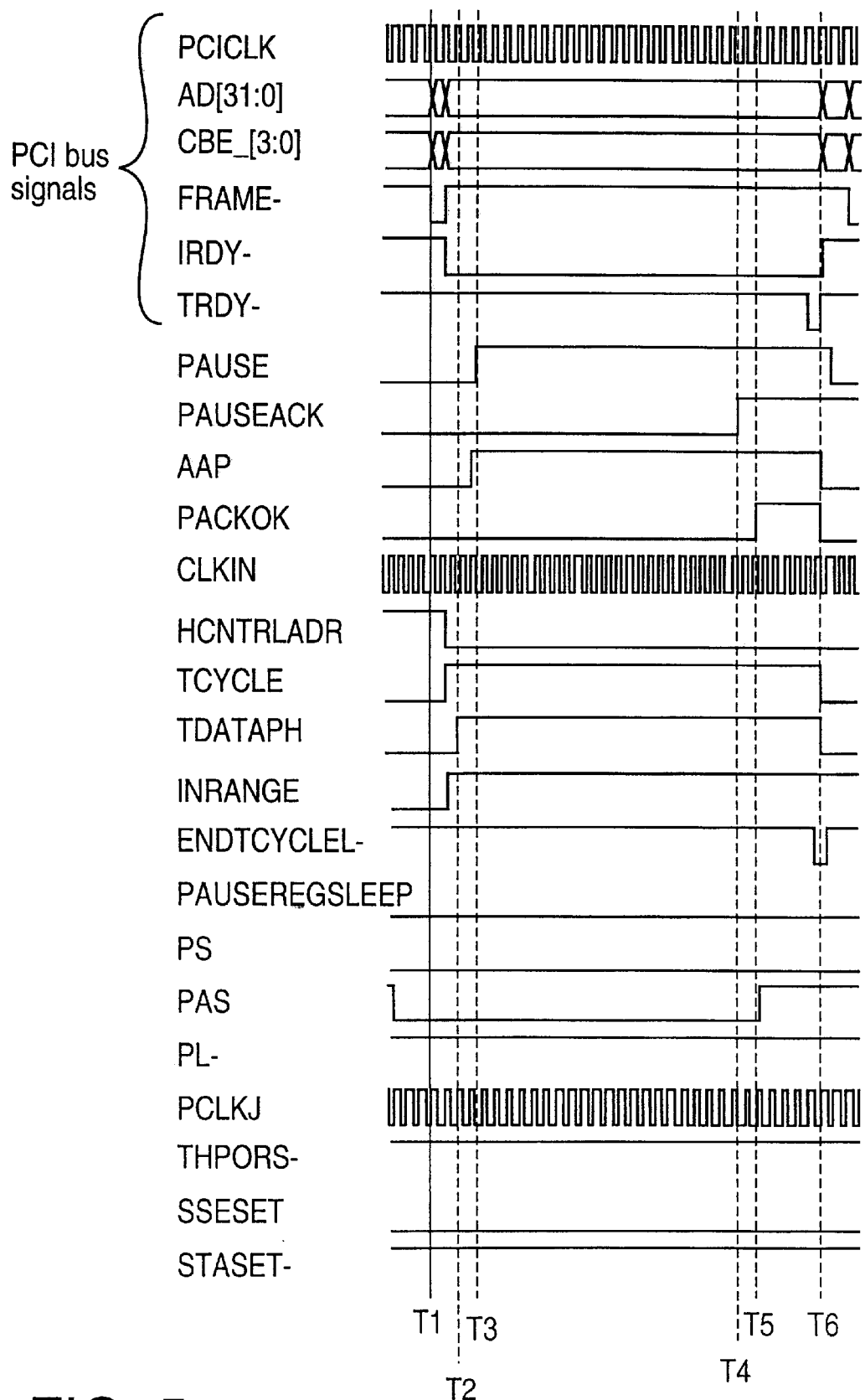
FIG. 5 is a waveform diagram representative of an operation of the autoaccess pause controller circuit of FIG. 3.

FIG. 3 is a state diagram describing an operation of a state machine which implements an embodiment of the autoaccess pause controller circuit 31 of FIG. 2. FIG. 4 lists the state transition conditions for the state diagram of FIG. 3. FIG. 5 is a waveform diagram of corresponding signals.

The state machine is clocked by clock signal PCLKJ. The value NOERROR which appears in FIG. 4 is the logical AND (see AND gate 109 in FIG. 6) of signals which request an autopause action and which include two error signals generated by the system bus interface logic 30. The first error signal, signal SSESET, indicates that a parity error has been detected in the address phase of the current PCI bus access on the system bus 3. The second error signal, signal STASET-, indicates that a condition has been detected for which a target abort status error should be sent onto the system bus. The value NOERROR appearing in FIGS. 3 and 4 is true when neither SSESET no STASET- is asserted, provided that the other signals which request an autopause action are also asserted.

The signal PAS appearing in FIG. 4 (i.e., pause acknowledge synchronized) is the pause acknowledge signal PAUSEACK received from sequencer block 6 after being synchronized to the clock PCLKJ by a 2-flip-flop synchronizer in the autoaccess pause controller circuit 31. The signal PS is the signal PAUSEREGSLEEP received from the system bus interface logic 30 after being synchronized to the clock PCLKJ by a 2-flip-flop synchronizer in the autoaccess pause controller circuit 31. A bar over a signal name in FIGS. 2–5 indicates that the signal is an inversion of another signal A signal name ending in a dash indicates that the signal is an active low signal.

Initially, the state machine is held in state 0 when the power on reset signal THPORS- is low. When THORPS- transitions high at the end of the power on reset period, the state machine is enabled to transition states. This low to high transition of signal THORPS- is denoted as condition "o" in FIG. 4. The values separated by slashes in each of the bubbles of the state diagram of FIG. 3 represent the digital values of the two outputs of the state machine. The digital value to the left of the slash indicates the digital value of the pause acknowledge okay signal PACKOK (i.e., pause acknowledge okay) whereas the digital value to the right of the slash indicates the digital value of the autoaccess pause request signal AAP (i.e., autoaccess pause request). The 0/0 appearing in the bubble of state 1 indicates that neither PACKOK nor AAP is asserted.

In FIG. 5, the uppermost six waveforms are waveforms of signals on the PCI bus 3 and represent an access of register 7 beginning of time T1. The high to low transition of the signal FRAME- indicates an address is present on the address/data conductors AD[31:0] of the PCI bus. The low to high transition of the signal FRAME- indicates the last data of the transfer is present on the address/data conductors. Signal IRDY- being low indicates the host is ready to transfer data.

If the PCI bus cycle is an attempted access of register 7, autoaccess pause controller 31 asserts the signal INRANGE. See FIG. 5. If neither of the two error signals SSESET and STASET- is asserted, then condition NOERROR is true. If the signal PAS (the synchronized version of signal PAUSEACK) is low and if the signal PS (the synchronized version of signal PAUSEREGSLEEP) is not asserted for this system bus cycle signal PS is latched in a flip-flop for the bus cycle and is supplied as signal PL- at a high value), then condition "a" of FIG. 4 is valid when the signal TCYCLE transitions high indicating a target cycle and when signal TDATAPH transitions high indicating that the data phase of the cycle has started. Condition "a" of FIGS. 3 and 4 is true at time T2 in FIG. 5. The state machine therefore transitions to state 2. As indicated by the 0/1 in the bubble of state 2 in FIG. 3, the autoaccess pause request signal AAP is asserted onto conductor 36.

Signal AAP being asserted onto conductor (see FIG. 2) causes OR gate 32 to assert signal PAUSE onto conductor 37. Signal PAUSE is asserted at time T3 in FIG. 5. The low to high transition of signal PAUSE causes the bus transfer logic 18 to stop (i.e., "pause") the operation, of sequencer 13 after the completion of the current read cycle from register 7. The bus transfer logic 20 then deasserts the signal BUFFER ENABLE on conductor 20 to disable bus buffer 9 to isolate sequencer block 6 from register 7. The bus transfer logic 18 may, in some embodiments, stop sequencer instruction execution by stopping the clock signal clocking the sequencer.

After the passing of a suitable amount of time to prevent contention on CIOBUS 10, bus transfer logic 18 asserts the pause acknowledge signal PAUSEACK on conductor 38. Signal PAUSEACK is asserted at time T4 in FIG. 5. The bus transfer logic 18 is a state machine which continues to operate despite sequencer 13 being paused. Because signal PAUSE is asserted and signal PAUSEACK is also asserted, AND gate 33 outputs a digital one and enables bus buffer 8 thereby coupling HIOBUS 11 to CIOBUS 10. The address on HIOBUS 11 which was blocked by buffer 8 from reaching CIOBUS 10 now reaches CIOBUS 10 and is decoded by decoder 26.

Asserting PAUSEACK causes signal PAS inside the auto access pause controller block 31 to be asserted. Condition "c" is therefore satisfied and the state machine therefore transitions from state 2 to state 3 as shown in FIG. 3. In state 3, signal AAP and pause acknowledge okay signal PACKOK are asserted by the state machine. Signal PACKOK transitions high at time T5 in FIG. 5. The read of register 7 from system bus 3 is enabled when both decoder 26 enables the output buffers of register 7 and signal PACKOK is asserted. The data from register 7 passes onto CIOBUS 10, through enabled buffer 8, onto HIOBUS 11, through enabled buffer 29, onto system bus 3, and to CPU 1.

When the system bus interface logic 30 receives the pause acknowledge signal PACKOK from the autoaccess pause controller circuit 31, the system bus interface logic 30 asserts a target ready signal TRDY- which has been delayed until the above conditions are valid. Signal TRDY- is a signal specified by the PCI bus protocol which when low indicates the target is ready to transfer data). The high to low transition of signal TRDY- indicates that the data from register 7 is now available on the system bus 3 and can be latched into CPU 1. The amount of time until signal TRDY- is asserted is determined by the amount of time required for data from register 7 to be valid on the system bus at the CPU and by timing specifications of the particular system bus. CPU 1 asserts handshake bus signal TRDY- high indicating that the CPU has received the data. The system bus cycle is therefore complete. The system bus interface logic 30 asserts the signal ENDTCYCLEL- low. Condition "d" of FIG. 4 is therefore true and the autoaccess pause controller state machine transitions from state 3 to state 1. On the transition from state 3 to state 1, both AAP and PACKOK are deasserted. Time T6 in FIG. 5 represents the time at which signals AAP and PACKOK transition low.

The sequence of states from state 1, to 2, to 3, to 1 is initiated by an attempted access from a CPU when sequencer 13 is already in the process of accessing register 7. In the event that sequencer 13 has just begun gaining control of CIOBUS 10, on the other hand, the autoaccess pause controller circuit 31 transitions to state 4 before transitioning to-state 2. The transition to state 4 delays the assertion of the signal AAP thereby allowing sequencer 13 time to complete the initiated access on the CIOBUS 10.

Whereas sequencer 13 is paused in the sequence of states from state 1, to 2, to 3, to 1 by an attempted access from a device on the system bus, sequencer 13 can also be paused by another device such as a SCSI block (not shown) of the host adapter integrated circuit. Rather than autoaccess pause controller circuit 31 asserting the PAUSE signal via signal AAP, the SCSI block itself indirectly asserts the signal PAUSE by causing signal PAUSEREGSLEEP to be asserted. Accordingly, the autoaccess pause controller circuit 31 does not assert the signal AAP in the sequence from state 1, to 5, to 6, to 1. However, there still exists the requirement to wait for the bus transfer logic 18 to assert the signal PAUSEACK before the signal PACKOK is asserted. Condition "g" of FIG. 4 therefore prevents state 6 from being entered until PAS (PAUSEACK synchronized) transitions high.

Signal PAUSEREGSLEEP is asserted either when: an error condition occurs and the sequencer is to be decoupled from register 7, or when the sequencer is to be placed in the "sleep" mode and sequencer 13 is therefore to be decoupled from register 7, or when the CPU sets a PAUSEREG signal (not shown) high by writing to a PAUSEREG bit of register HCNTRL (not shown). In all these conditions, the sequencer is to be decoupled from the CIOBUS. (The sequencer can be deactivated in a low power "sleep" mode. When the sequencer is in the sleep mode, it is not being clocked and does not access the CIOBUS.)

In the condition when a device other than the autoaccess pause controller circuit 31 has asserted the pause signal and the PAUSEACK signal has already been asserted by sequencer block 6, the autoaccess controller circuit only needs to assert the signal PACKOK back to the system bus interface logic 30. The autoaccess pause controller circuit 31 therefore transitions from state 1, to 7, and back to state 1.

If a register is too slow when, for example, a fast CPU writes to the register and then attempts to read the contents of the register back, the contents of the register will not be updated in time. The CPU will therefore read improper register contents. The sequence of states from state 1, to 8, to 9, to 1 is therefore provided to stretch the system bus cycle of the CPU by delaying return of the PACKOK signal to the system bus interface logic 30 until PAS and PS are identical. By delaying the signal PACKOK being asserted, the assertion of signal TRDY- is also delayed so that the CPU will not terminate the cycle until the contents of the register are correct. The particular register in the embodiment of FIG. 2 is the register HCNTRL) (again, not shown). A flip-flop corresponding with flip-flop 14 in the embodiment of FIG. 1 may be one bit of the HCNTRL register. The signal HCNTRLADR in FIG. 2 is asserted during an attempted access of the HCNTRL register.

DETAILED OPERATION OF THE SPECIFIC CIRCUIT OF FIG. 6

Figure 6A:
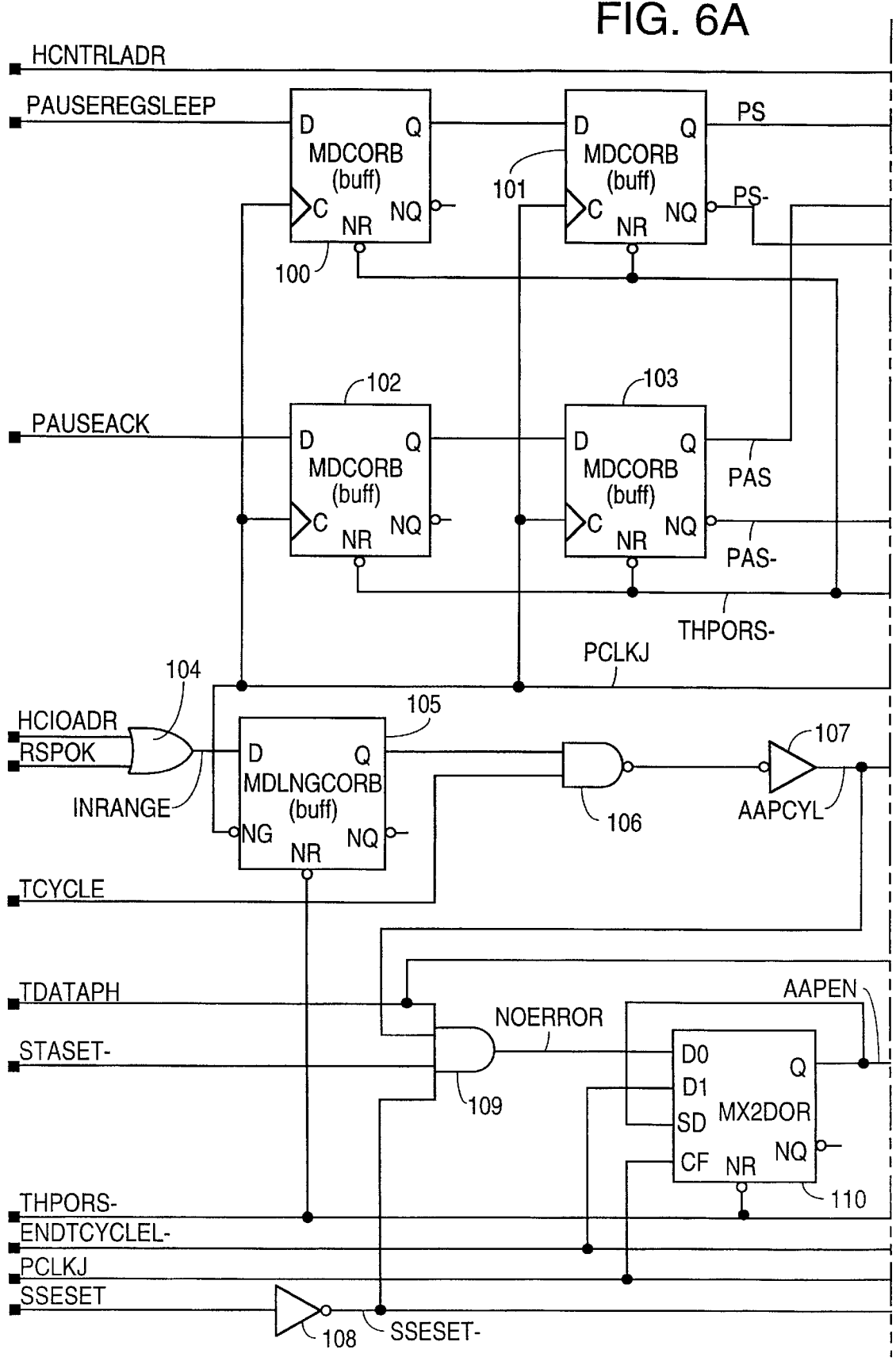
FIG. 6 is a detailed circuit diagram of a specific embodiment of an autoaccess pause controller circuit in accordance with the present invention.
Figure 6B:
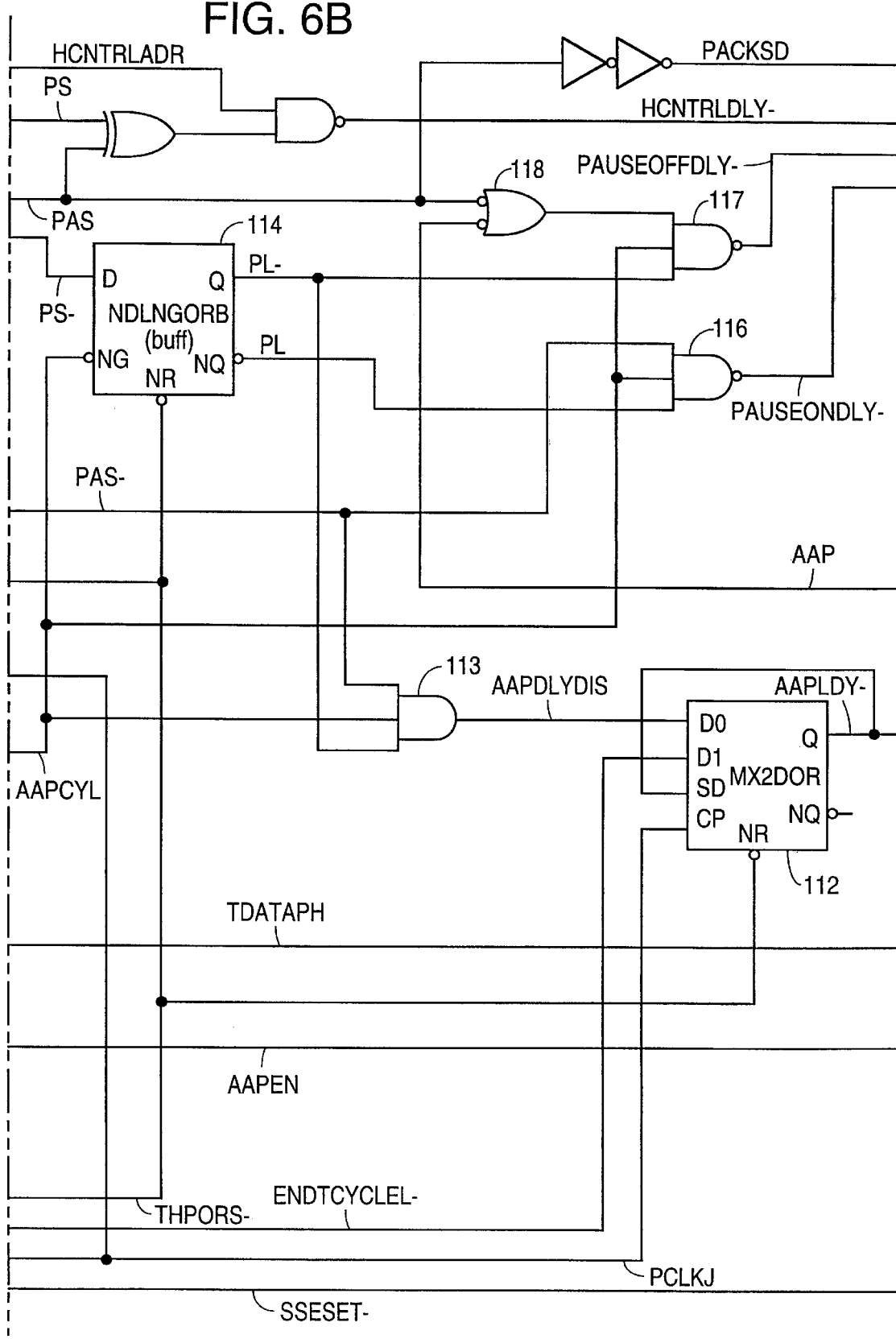
Figure 6C:
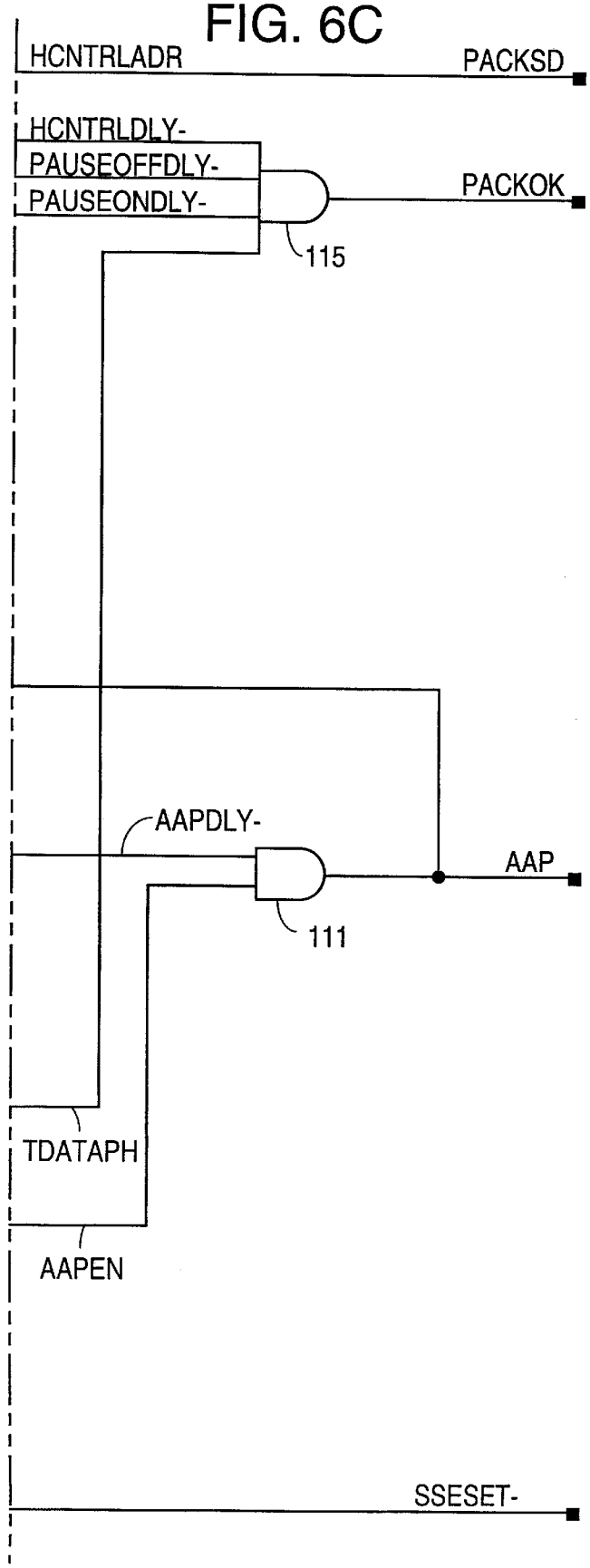
Figure 6:
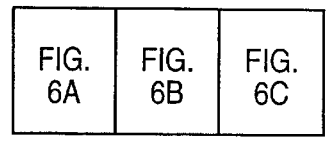

FIG. 6 is detailed circuit diagram of an autoaccess pause controller circuit 31 in accordance with a specific embodiment of the present invention. The signal PAUSEREGSLEEP is synchronized to the state machine clock PCLKJ by flip-flops 100 and 101 to generate signal PS and PS-. The signal Signals PAUSEACK is synchronized to the state machine clock PCLKJ by flip-flops 102 and 103 to generate signals PAS and PS-. When a device on system bus 3 (for example, a CPU) attempts to access a device on CIOBUS 10, signal INRANQE is asserted. In the specific embodiment of FIG. 6, assertion of either signal HCIOADR or signal RSPOK causes OR gate 104 to assert signal INRANGE. To provide settling time for the decoding circuitry which generates the signals HCIOADR and RSPOK, a latch 105 delays transferring signal INRANGE for the current clock cycle until the falling edge of PCLKJ (when the latch is opened). NAND gate 106 and inverter 107 gate the signal output by latch 105 with the target cycle signal TCYCLE so that signal AAPCYL is asserted only when TCYCLE is high.

The signal AAPCYL, the signal SSESET- which is generated by inverter 108, the target data phase signal TDATAPH, and the signal STASET- are supplied to the four input leads of a four-input AND gate 109. Coupling signals SSESET and STASET- to two input leads of AND gate 109 allows an occurrence of an error condition to prevent the initiation of an automatic pause cycle. Supplying signal TDATAPH to an input lead of AND gate 109 ensures that the conditions giving rise to an autoaccess pause will only be tested during the data phase of a target bus cycle after the address phase of the target bus cycle signal has been completed. Supplying signal AAPCYL to an input lead of AND gate 109 allows an autoaccess pause to occur only for INRANGE target bus cycles.

If the signal output by AND gate 109 is asserted during the data phase, then flip-flop 110 is set. The signal output from flip-flop 110 is denoted AAPEN (i.e., autoaccess pause enable). Signal AAPEN is supplied to one of the input leads of a two-input AND gate 111. The signal output by AND gate 111 is the autoaccess pause signal AAP which is coupled to one input lead of a two input OR gate 32 of FIG. 2. The signal output by OR gate 32 of FIG. 2 is the signal PAUSE and is supplied to sequencer block 6.

The assertion of autoaccess pause signal AAP by the signal AAPEN is time-controlled by the signal AAPDLY- output by a flip-flop 112. Flip-flop 112 delays the assertion of the autoaccess pause signal AAP if the pause acknowledge synchronized signal PAS is still asserted from a previous access. This ensures that the sequencer block 6 fully gains control of the CIOBUS before control of the CIOBUS is taken back by the CPU. Only after signal PAS- from flip-flop 103 transitions to a digital one indicating that the pause acknowledge is no longer asserted can the signal output from AND gate 113 transition to a digital one and can flip-flop 112 output a digital one thereby deasserting the autoaccess pause delay signal AAPDLY- and allowing the autoaccess pause signal AAP to be asserted.

One input of AND gate 113 is coupled to receive signal PL- from the Q output of latch 114 (the state of PS- is stored in latch 114 by signal AAPCYL when signal TCYCLE is asserted and the value of signal INRANGE latched in latch 105 is high. In the event that PAUSEREGSLEEP is asserted, signal PS- will be a digital zero, PL- will be a digital zero, and the signal output from AND gate 113 will remain at a digital zero. Flip-flop 112 will therefore continuously maintain the autoaccess pause delay signal AAPDLY- at a digital zero thereby preventing the autoaccess pause request signal AAP from being asserted to a digital one for the entire system bus access.

The period that PACKOK is asserted can be extended. PACKOK is extended to remain asserted until the PCI data transfer handshake condition occurs (i.e., signals IRDY- and TRDY- are both asserted).

The assertion of the pause acknowledge okay signal PACKOK can also be delayed. Signal PACKOK is generated by an AND gate 115. If either PAUSEONDLY- or PAUSEOFFDLY- is a digital zero, then PACKOK is held at a digital zero. At the beginning of an autoaccess pause transfer when sequencer block 6 is being paused and the system bus 3 is being coupled to the CIOBUS 10, the signal PACKOK cannot be asserted and supplied to the target block so early that the sequencer block has not yet given up control of the CIOBUS and the system bus has not yet gained control. In such a situation, data on the CIOBUS could be corrupted. The signals TDATAPH, PAUSEONDLY-, PAUSEOFFDLY-, and HCNTRLDLY- are supplied to the four input leads of four-input AND gate 115. Coupling signal TDATAPH to an input lead of AND gate 115 enables gate 115 output signal PACKOK to transition high in the data phase of an access, when none of the other three input leads is asserted low. System bus interface logic 30 waits until PACKOK is high before completing the access by asserting the end-cycle-latched signal ENDTCYCLEL-. ENDTCYCLEL- asserted low causes flip-flops 110 and 112 to output zeros and causes signal AAP to transition low in preparation for the next cycle.

Signal PL (the latched output state of PS in latch 114) determines which one of the signals PAUSEONDLY- and signal PAUSEOFFDLY- will become active when signal AAPCYL transitions high at the beginning of an autoaccess pause transfer. The signals PL, PAS- and AAPCYL are supplied to the three input leads of a three-input NAND gate 116 whose output is signal PAUSEONDLY-. PAUSEONDLY- will be low thereby delaying PACKOK from transitioning high when an access starts with signals PL, PAS- and AAPCYL at a digital one. PAUSEONDLY- transitions high and stops delaying PACKOK when PAS- transitions low (i.e. PS (PAUSEREGSLEEP) and PAS (PAUSEACK) are both at a digital one). When PACKOK transitions high, the access can proceed to completion with AAP not being asserted.

The signal PL-, the signal AAPCYL, and the output of two-input NAND gate 118 are supplied to the three input leads of a three-input NAND gate 117 whose output is signal PAUSEOFFDLY-. Taking note of the fact that an OR gate with inverted inputs constitutes a NAND gate NAND gate 118 is illustrated as an OR gate with inverted inputs in FIG. 6. PAUSEOFFDLY- will be low delaying PACKOK from transitioning high when an access starts with signals PL-, AAPCYL, and the output of NAND gate 118 at a digital one. PAUSEOFFDLY- transitions high and stops delaying PACKOK when the output of NAND gate 118 transitions low. The output of NAND gate 118 transitions low in two cases. Firstly, AAP is at a digital zero and PAS is still at a digital one from a previous access. The output of NAND gate 118 transitions to a digital zero when the following sequence is completed: PAS- transitions high as PAS transitions to a digital zero, AAP output signal AAPDYLDIS from AND gate 113 transitions high, AAPDLY- transitions high, transitions to a digital one, and PAS transitions back to a digital one. Secondly, AAP and PAS are both digital zeros. The output of NAND gate 118 transitions to a digital zero when PAS transitions to a digital one in response to AAP's prior transitioning to a digital one. When the output of NAND gate 118 transitions low, PACKOK transitions high and the access proceeds to completion with AAP asserted.

At the end of an autoaccess pause transfer when the system bus 3 is being isolated from the CIOBUS 10 and the sequencer block 6 is being restarted, buffer 8 is disabled by AND gate 33 of FIG. 2 when AAP transitions low. Output signal PACKSD is a buffered signal used by other logic which is located in the system interface logic 30 and which takes advantage of the synchronized pause acknowledge signal PAS available in the auto access pause controller circuit 31.

A problem may arise in the structure of FIG. 1 if CPU 1 on system bus 3 is a fast processor. The pause acknowledge signal may still be asserted from a previous autoaccess pause instruction when CPU 1 sets the pause flip-flop. Then quickly before circuitry in the host adapter integrated circuit has the opportunity to deassert the pause acknowledge signal, CPU 1 may poll the poll bit and erroneously determine that access to the CIOBUS has been obtained. Data read by the CPU may therefore be invalid because register 7 had not yet been coupled to the system bus. To prevent this situation, delays may be built into the software driver to delay the first poll of the poll bit to make sure that the poll bit is valid for the currently attempted autoaccess pause operation.

The operation and architecture of the specific embodiment of FIGS. 2–6 comprising a PCI system bus interface may be better understood with reference to the following two documents: 1) the book entitled "PCI Hardware and Software Architecture and Design" by Edward Solari and George Willse published by Annabooks of San Diego, Calif., and 2) the specification entitled "PCI Local Bus Specification" by the PCI Special Interest Group, 5200 N.E. Elam Young Parkway, Hillsboro, Oreg. 97124. For embodiments wherein the host adapter integrated circuit has a Fibre Channel interface block for communication with a device such as a disk drive, information on the Fibre Channel can be obtained from Global Engineering, 15 Inverness Way East, Englewood, Colo. 80112. The document entitled "Fibre Channel—Physical And Signaling Interface (FC-H)", revision 4.2, is incorporated herein by reference.

GUIDE TO MICROFICHE SCHEMATICS

The microfiche appendix contains schematics of a specific embodiment of a host adapter integrated circuit. The schematics of the microfiche appendix correspond with the embodiment of FIG. 2 as follows. The system bus interface 28 and the sequencer block 6 of FIG. 2 correspond with the blocks PHOST and SEQUENCER of the schematic LANCE.1 of the microfiche appendix, respectively. The bus transfer logic 18 and the buffer 9 of FIG. 2 correspond with the blocks INTCTRL and blocks ALU and TSBNQX of the schematic SEQ of the microfiche appendix, respectively. The autoaccess pause controller circuit 31 of FIG. 2 corresponds with the schematic TARGET.7 of the microfiche appendix. Structure corresponding with bus buffer 8 of FIG. 2 is found on the schematic HCIODEC.7 of the microfiche appendix. A structure corresponding with buffer 29 of FIG. 2 is found on the schematic PATH_IN.1. Signals which correspond with signals TCYCLE, TDATAPH and ENDTCYCLEL- of FIG. 2 are generated by circuitry on schematic TARGET.1 of the microfiche appendix. A signal which corresponds with signal RSPOK of FIG. 2 is generated by circuitry in block ROMSPCMP on schematic IMRADRCMP of the microfiche appendix. A signal which corresponds with the signal PAUSEREGSLEEP is generated by circuitry on schematic HIODEC.3 of the microfiche appendix. Gates which correspond with gates 32 and 33 of FIG. 2 are found on schematics HCIODEC.3 and HIODEC.7 of the microfiche appendix, respectively. Signals which correspond with signals HCNTRLADR and HCIOADR of FIG. 2 is generated by circuitry on schematics PATH_IN.1 and PATH_IN.3 of the microfiche appendix, respectively.

Although the present invention has been described in connection with certain exemplary embodiments, the present invention is not limited thereto. Although one example of a system bus interface and sequencer block usable with the present invention is set forth in U.S. patent application Ser. No. 07/964,532, cited above, other suitable system bus interfaces and sequencers may be employed. Numerous state machines other than the specific state machine of FIG. 6 can be fashioned using well known design techniques to realize other autoaccess pause controller circuits in accordance with the present invention. It is to be understood, therefore, that various changes, modifications, adaptations and combinations of various features of the described specific embodiments may be practiced without departing from the scope of the invention as set forth in the appended claims.

I claim:

1. An integrated circuit comprising:
   a digital resource having data-containing locations identified by corresponding digital a digital processor capable of accessing the data-containing locations of the digital resource; and
   a system bus interface coupled to an external system bus which extends outside the integrated circuit, the system bus interface comprising an autoaccess pause controller circuit for supplying a pause request signal to the digital processor in direct response to one of the digital resource addresses (a) originating outside the integrated circuit, (b) supplied to the external system bus, and (c) furnished from the external system bus to the system bus interface during an attempted access of the corresponding data-containing location of the digital resource by the external system bus, the pause request signal causing the digital processor to pause any current access of the digital resource by the digital processor.

2. An integrated circuit as in claim 1 wherein the system bus interface includes means for examining addresses supplied from the external system bus and, upon determining that an address supplied from the external system bus is one of the digital resource addresses, for automatically providing at least one signal that causes the autoaccess pause controller circuit to supply the pause request signal.

3. An integrated circuit as in claim 2 wherein the examination means compares addresses supplied from the external system bus to stored addresses comprising the digital resource addresses.

4. An integrated circuit as in claim 3 wherein the stored addresses include addresses besides the digital resource addresses.

5. An integrated circuit as in claim 1 wherein, after receiving the pause request signal to pause any current access of the digital resource by the digital processor, the digital processor supplies a pause acknowledge signal to the autoaccess pause controller circuit to indicate that the digital processor has paused any current access of the digital resource by the digital processor.

6. An integrated circuit as in claim 1 wherein the autoaccess pause controller circuit comprises:
   means responsive to each digital resource address for automatically generating the pause request signal; and
   means, responsive to a pause acknowledge signal supplied from the digital processor to indicate that it has paused any current access of the digital resource by the digital processor, for generating a pause acknowledge okay signal that causes generation of a ready signal which indicates to the external system bus that the digital processor has paused any current access of the digital resource by the digital processor.

7. An integrated circuit as in claim 6 wherein the system bus interface includes interface means for generating the ready signal in response to the pause acknowledge okay signal.

8. An integrated circuit as in claim 1 further including a first buffer for selectively coupling the digital processor to the digital resource in response to a buffer enable signal supplied from the digital processor to the first buffer.

9. An integrated circuit as in claim 8 wherein, after receiving the pause request signal to pause any current access of the digital resource by the digital processor, the digital processor supplies a pause acknowledge signal to the autoaccess pause controller circuit to indicate that the digital processor has paused any current access of the digital resource by the digital processor.

10. An integrated circuit as in claim 9 further including means for supplying the second buffer with a buffer enable signal in response to both the pause request signal and the pause acknowledgement signal.

11. An integrated circuit as in claim 8 further including a second buffer for selectively coupling the digital resource to the external system bus.

12. An integrated circuit as in claim 11 wherein the second buffer selectively couples the digital resource to the external system bus in response to a pause acknowledge signal supplied from the digital processor to the second buffer to indicate that the digital processor has paused any current access of the digital resource by the digital processor.

13. An integrated circuit as in claim 1 wherein the digital resource constitutes one of a SCSI bus interface control block, a data FIFO, a scratch RAM, a host address register, a host counter register, and a FIBRE CHANNEL interface block.

14. An integrated circuit as in claim 1 wherein the external system bus constitutes one of a PCI bus, an ISA bus, an EISA bus, a VL bus, and an S bus.

15. A method of accessing data-containing locations of a digital resource of an integrated circuit by a digital processor of the integrated circuit and by an external system bus coupled to the integrated circuit and extending outside the integrated circuit, the data-containing locations being identified by corresponding digital resource addresses, the method comprising:

examining addresses (a) originating outside the integrated circuit, (b) supplied to the external system bus, and (c) supplied from the external system bus to the integrated circuit;

and, in direct response to a determination that an address supplied from the external system bus to the integrated circuit is one of the digital resource addresses, supplying a pause request signal to the digital processor for causing the digital processor to pause any current access of the digital resource by the digital processor.

16. A method as in claim 15 wherein the examining step comprises comparing addresses supplied from the external system bus to addresses stored in the integrated circuit.

17. A method as in claim 15 further including the step of providing a pause acknowledge signal from the digital processor to indicate that it has paused any current access of the digital resource.

18. A method as in claim 17 further including the step of converting the pause acknowledge signal into a ready signal supplied to the external system bus to indicate that it can access the digital resource.

* * * * *